United States Patent [19]
Yeh et al.

[11] Patent Number: 5,225,677
[45] Date of Patent: Jul. 6, 1993

[54] PROTECTIVE FILM FOR X-RAY DETECTOR

[75] Inventors: Lun-Shu R. Yeh, Berkeley Heights, N.J.; Joseph A. Nicolosi, Bardonia, N.Y.; Costas Blionas, Hackensack, N.J.

[73] Assignee: North American Philips Corporation, New York, N.Y.

[21] Appl. No.: 898,772

[22] Filed: Jun. 12, 1992

[51] Int. Cl.⁵ .......................... G01T 1/00; G01T 1/24
[52] U.S. Cl. ................................. 250/336.1; 250/352; 250/370.01
[58] Field of Search ............... 250/336.1, 370.01, 352, 250/370.15, 367, 370.11

[56] References Cited

U.S. PATENT DOCUMENTS

| | | | |
|---|---|---|---|
| 3,586,857 | 6/1971 | Glasow | 250/370.01 |
| 3,727,058 | 4/1973 | Schrey | 250/352 |
| 4,801,803 | 1/1989 | Denen et al. | 250/336.1 |
| 4,931,650 | 6/1990 | Lowe et al. | 250/397 |
| 5,132,539 | 7/1992 | Kwasnick et al. | 250/370.11 X |

OTHER PUBLICATIONS

Baertsch et al, "Gamma Ray Detectors Made from High Purity Germanium", IEEE Trans. Nuclear Sci., vol. NS-17, pp. 235-240, Mar. 1970.

F. S. Goulding et al., "Photon-Excited Energy-Dispersive X-ray Fluorescence Analysis for Trace Elements", Annual Review of Nuclear Science, vol. 23, 1973, pp. 45-74.

N. W. Madden et al., "An Improved Operating Mode For a Si(Li) X-ray Spectrometer" IEEE Transactions on Nuclear Science, vol. 37, No. 2, Apr. 1990, pp. 171-176.

F. S. Goulding et al., "Detector Background and Sensitivity of Semiconductor X-ray Fluorescence Spectrometers", Advances in X-ray Analysis, vol. 15, 1972, pp. 470-482.

Primary Examiner—Constantine Hannaher
Assistant Examiner—Edward J. Glick
Attorney, Agent, or Firm—Anne E. Barschall

[57] ABSTRACT

An x-ray detector assembly is improved by covering the detector holder with a dielectric film to prevent contamination of the sides of the detector without covering the front of the detector. The film does not hermetically seal the detector holder.

9 Claims, 1 Drawing Sheet

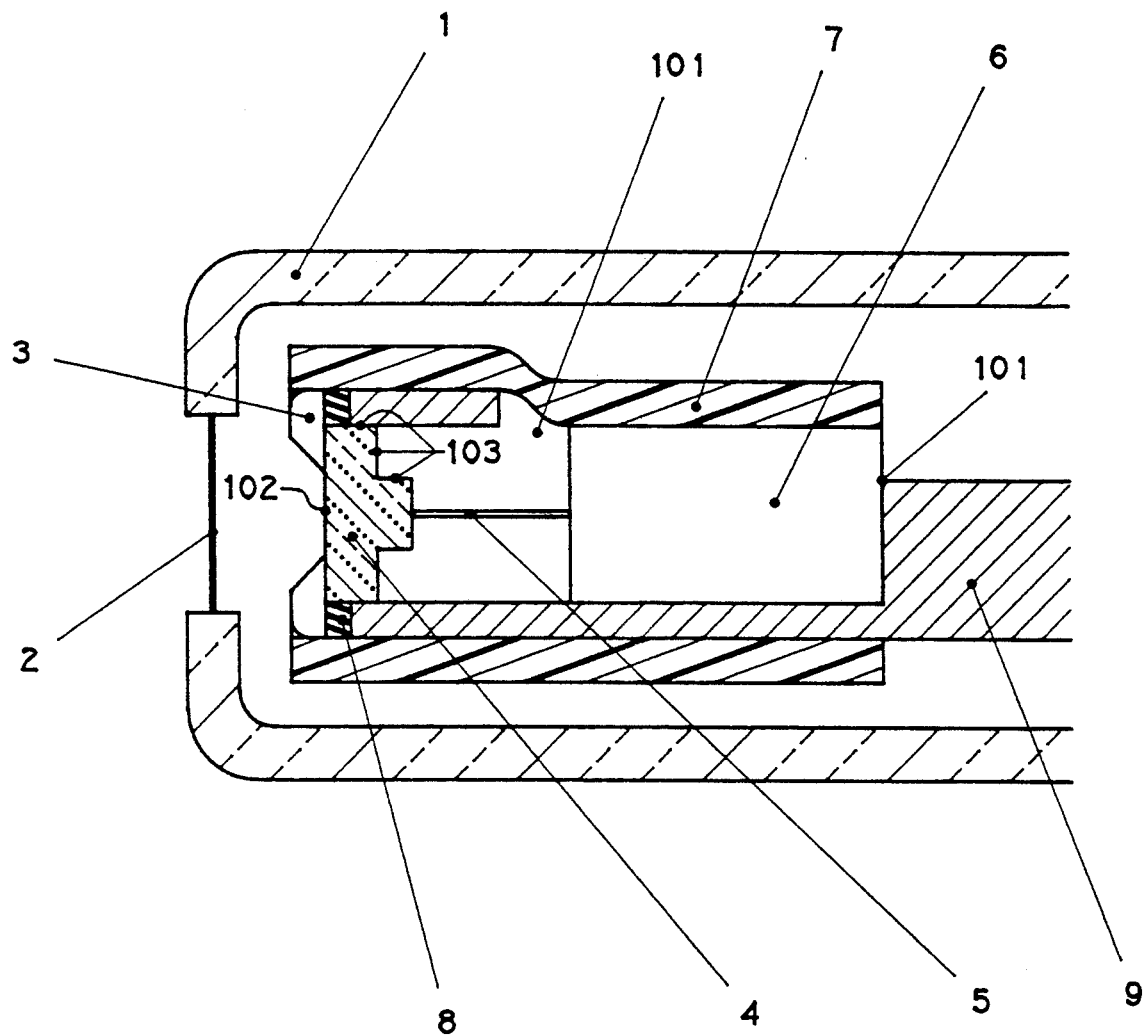

PROTECTIVE FILM FOR X-RAY DETECTOR

BACKGROUND OF THE INVENTION

1. Field of the Invention

The invention relates to the field of cryogenically cooled solid state x-ray detectors. In particular, the invention relates to preventing contamination and icing of the detectors.

2. Related Art

X-ray detectors are maintained and operated at cryogenic temperature, i.e. at the temperature of liquid nitrogen, to retain high performance in energy resolution and low background noise and to extend service life. Most vapors, e.g. moisture, vapors of vacuum pump oils, and decomposed materials from plastics and other packing or insulation materials in the vacuum chamber, can condense and deposit on the detector surface rendering the detector inoperative. These vapors gain access to the detector via openings in the detector holder left to allow insertion of the detector during manufacturing.

Art relating to the development of x-ray detectors includes F. S. Goulding and J. M. Jaklevic, "Photon-excited Energy-dispersive X-ray Fluorescence Analysis for Trace Elements", Annual Review of Nuclear Science, Vol. 23, 1973, pp. 45-74; N. W. Madden, et al., "An Improved Operating Mode for a Si(Li) X-ray Spectrometer", IEEE Transactions on Nuclear Science, Vol. 37, 1990, pp. 171-176; and F. S. Goulding et al., "Detector Background and Sensitivity of Semiconductor X-ray Fluorescence Spectrometers", Advances in X-ray Analysis, Vol. 15, 1972, pp. 470-482.

Currently, when the cleanliness of the detector environment becomes questionable, various methods are used to prevent contamination. These include: a mechanism to retract the detector when it is not in use; thermal energy to drive off contaminants (see e.g. U.S. Pat. No. 4,931,650); placing the detector in a deeply recessed holder; and enclosing the whole body of the detector holder. These designs compromise performance or are costly.

To achieve best performance, the detector must be placed within a few millimeters of the sample of interest to increase sensitivity and solid angle of detection. Any extra enclosures around the detector holder increase the distance between the detector and the sample.

SUMMARY OF THE INVENTION

Experiments reveal that the surface of the detector facing the entering x-rays is rather inert; but the sides of the detector are very sensitive to contamination. Therefore, even when the detector is used in a hostile environment, the detector can still be placed close to the sample to maximize its sensitivity as long as the sides of the detector are protected.

The object of the invention is to keep contaminants off the critical dielectric side surfaces of the detector and supports in a cheap, effective manner, without compromising detector performance.

This object is achieved by reducing the probability of depositing contaminants on such critical surfaces. In the preferred embodiment, the sides of the detector and the detector holder are wrapped with a dielectric film; preferably a plastic film. The film should at least partially cover any openings in the detector holder leading to the side surfaces of the detector.

BRIEF DESCRIPTION OF THE DRAWING

The invention will now be described by way of non-limitative example with reference to the single drawing FIGURE.

The single FIGURE shows a schematic cross section of a detector assembly according to the invention.

DETAILED DESCRIPTION OF THE PREFERRED EMBODIMENTS

The FIGURE is not to scale. The sizes of various components have been exaggerated and changed in order to facilitate viewing of various components.

A detector assembly according to the invention may take many forms. One embodiment is shown in the FIGURE. A vacuum container 1 includes an x-ray entrance window 2 and contains the assembly. A solid state detector 4 is held in place by a frame 9 which can also serve as a cold finger to a dewar, not shown. A front surface 102 of the detector 4 is adjacent to the window 2. An electrical contact assembly 5 connects the detector 4 to an FET assembly 6. A high voltage contact 3 applies the operating voltage of 500-1000V D.C. An opening 101 appears in the frame 9. This opening 101 is for the purpose of inserting parts into the frame 9 during manufacturing.

Contaminants can reach the critical surfaces 103 of the detector 4 through the opening 101. A thin dielectric film 7 covering at least part of the opening 101 increases the path length between the vacuum chamber and the critical side surfaces 103 of the detector 4. The dielectric film 7 is shown far thicker than it actually is. If the dielectric film were shown to scale it would not be visible on this FIGURE. The critical surfaces include the sides 103 of the detector 4 and thin dielectric gaps 8 made of electrically insulating and thermally conductive material. As with the film 7, the size of the dielectric gaps 8 has been exaggerated in the FIGURE so that the gaps will be visible. The film 7 may entirely cover the opening 101; it may extend onto the FET assembly 6, as shown in the FIGURE; or it may cover only part of the opening 101 near the critical surfaces 103, for instance by stopping just before the FET assembly 6. In each case the film 7 increases the path length which contaminants would have to follow in order to condense on the critical surfaces 103.

Preferably the film is standard TEFLON ® tape. TEFLON ® is a trade mark of the Du Pont Company. The thickness of the tape is not critical. The tape is wrapped from the front surface of the detector 4 toward the opening 101. The film preferably has a thickness in the range 0.02 to 0.1 mm. The TEFLON ® tape can be secured using a polyester tape, preferably MYLAR ® film a few $\mu$m thick to give uniform pressure. MYLAR ® is also a trademark of the Du Pont Company. The MYLAR ® tape can in turn be secured using a small piece of tape containing adhesive, such as SCOTCH ® brand MAGIC TRANSPARENT tape.

The film should not seal off the opening 101 hermetically. During evacuation, air needs to be removed through the opening 101. A hermetically sealed film would prevent evacuation.

Other dielectric materials can be used for the film such as fluorocarbons, chlorofluorocarbons, polyesters, polyethylene, polypropylene, and nylon. Media which are easily formed during manufacturing, such as tapes, are preferred.

Other configurations of the detector assembly can use a similar film. For instance, the opening through which the detector is inserted may be at the front end of the frame. In such a case the dielectric film must still cover the sides of the detector but not the front, i.e. not the surface of the detector which receives the x-rays.

What is claimed is:

1. An x-ray detector assembly comprising
a solid state x-ray detector having a front surface for receiving x-rays and at least one side surface; and
a dielectric film disposed around said side surface, said film not covering said front surface.

2. The assembly of claim 1, wherein the film comprises one of the following materials: polytetrafluoroethylene, a fluorocarbon, a chlorofluorcarbon, a polyester, polyethylene, polypropylene, and nylon.

3. The assembly of claim 1 further comprising a detector holder containing said detector and forming an opening through which said detector is inserted during manufacturing and wherein said film covers at least part of said opening.

4. The assembly of claim 3 wherein the film comprises one of the following materials: polytetrafluoroethylene, a fluorocarbon, a chlorofluorcarbon, a polyester, polyethylene, polypropylene, and nylon.

5. The assembly of claim 4 wherein the film comprises polytetrafluoroethylene tape wrapped about an exterior surface of said holder starting at a first end of said holder adjacent to said front surface and ending at an ending point on the exterior surface not adjacent to said front surface.

6. The assembly of claim 5 wherein said film further comprises a polyester tape wrapped about the ending point to secure the polytetrafluoroethylene tape.

7. The assembly of claim 6 wherein said film further comprises a tape with an adhesive surface securing the polyester tape.

8. The assembly of claim 3 wherein the film completely covers the opening without hermetically sealing it.

9. A cryogenically cooled x-ray detector comprising the assembly of claim 1.

* * * * *